(12) United States Patent
Kanenari

(10) Patent No.: US 7,704,343 B2
(45) Date of Patent: Apr. 27, 2010

(54) METHOD OF MANUFACTURING PNEUMATIC TIRE AND TIRE BUILDING MACHINE USED THEREFOR

(75) Inventor: Daisuke Kanenari, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 820 days.

(21) Appl. No.: 10/560,838

(22) PCT Filed: Jul. 15, 2004

(86) PCT No.: PCT/JP2004/010098

§ 371 (c)(1),
(2), (4) Date: Dec. 15, 2005

(87) PCT Pub. No.: WO2005/007392

PCT Pub. Date: Jan. 27, 2005

(65) Prior Publication Data

US 2007/0095458 A1    May 3, 2007

(30) Foreign Application Priority Data

Jul. 16, 2003  (JP) .............................. 2003-275293
Jul. 16, 2003  (JP) .............................. 2003-275296

(51) Int. Cl.
*B29D 30/30*  (2006.01)

(52) U.S. Cl. .................... 156/130.5; 152/510; 156/123; 156/133

(58) Field of Classification Search ................. 156/111, 156/123, 130.5, 414–417; 152/510; 425/40–42, 425/50

See application file for complete search history.

(56) References Cited

U.S. PATENT DOCUMENTS

| 3,713,929 | A  | * | 1/1973  | Bottasso et al. | ............. 156/127 |
| 4,468,267 | A  | * | 8/1984  | Irie            | ............. 156/132 |
| 5,944,926 | A  | * | 8/1999  | Hesse           | ............. 156/132 |
| 6,136,123 | A  | * | 10/2000 | Kaido et al.    | ............. 156/123 |
| 6,332,999 | B1 | * | 12/2001 | Caretta         | ............. 156/414 |
| 6,409,959 | B1 | * | 6/2002  | Caretta et al.  | ............. 264/501 |
| 6,468,062 | B1 | * | 10/2002 | Soulalioux et al. | ........... 425/50 |
| 2002/0033557 | A1 | * | 3/2002 | Hashimura et al. | .......... 264/315 |
| 2004/0123936 | A1 | * | 7/2004 | Conger et al.   | ............. 156/123 |

FOREIGN PATENT DOCUMENTS

| JP | 06-234172 A | * | 8/1994 |
| JP | 08-258506 A |   | 10/1996 |
| JP | 10-025375 A |   | 1/1998 |
| JP | 11-199713 A |   | 7/1999 |
| JP | 2002-028987 A |   | 1/2002 |
| JP | 2004-106398 A |   | 4/2004 |
| WO | WO-96/34736 A1 |   | 11/1996 |

OTHER PUBLICATIONS

International Search Report, Oct. 19, 2004.

\* cited by examiner

*Primary Examiner*—Geoffrey L Knable
(74) *Attorney, Agent, or Firm*—Greer, Burns & Crain, Ltd.

(57) ABSTRACT

A method of manufacturing a pneumatic tire having an innerliner formed of thermoplastic elastomer. The method comprises the steps of: heating a surface of a tire building drum in advance; placing the innerliner on the heated surface of the tire building drum, the innerliner being cylindrically shaped and having a radially outer surface to which an adhesive has been applied; disposing uncured tire components radially outwardly of the innerliner to form a green tire; and curing the green tire.

5 Claims, 4 Drawing Sheets

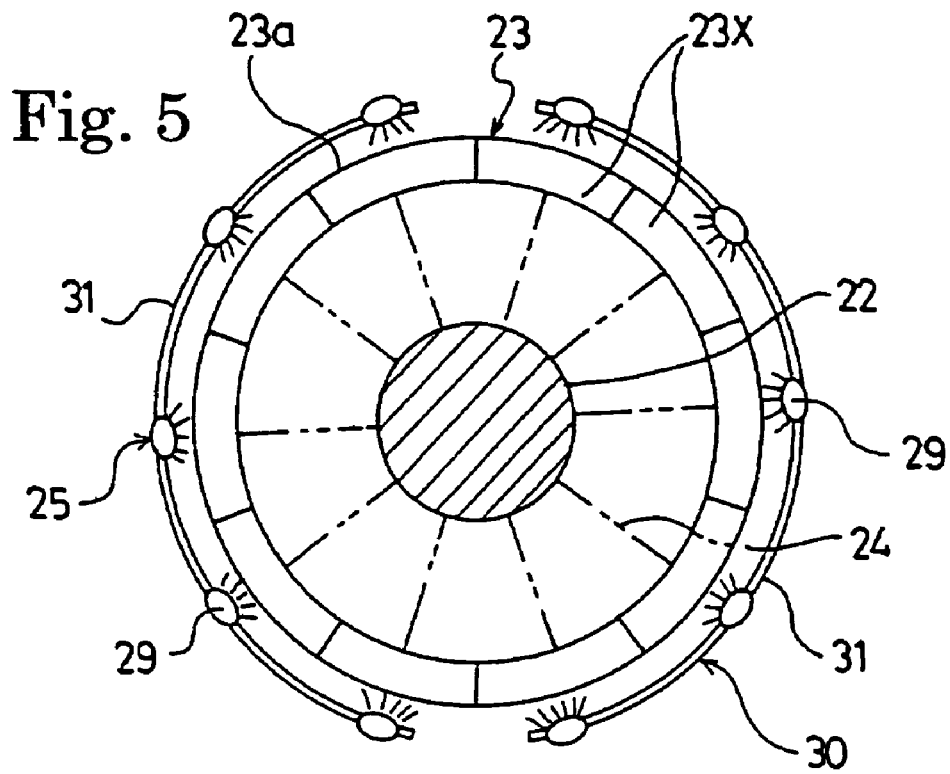
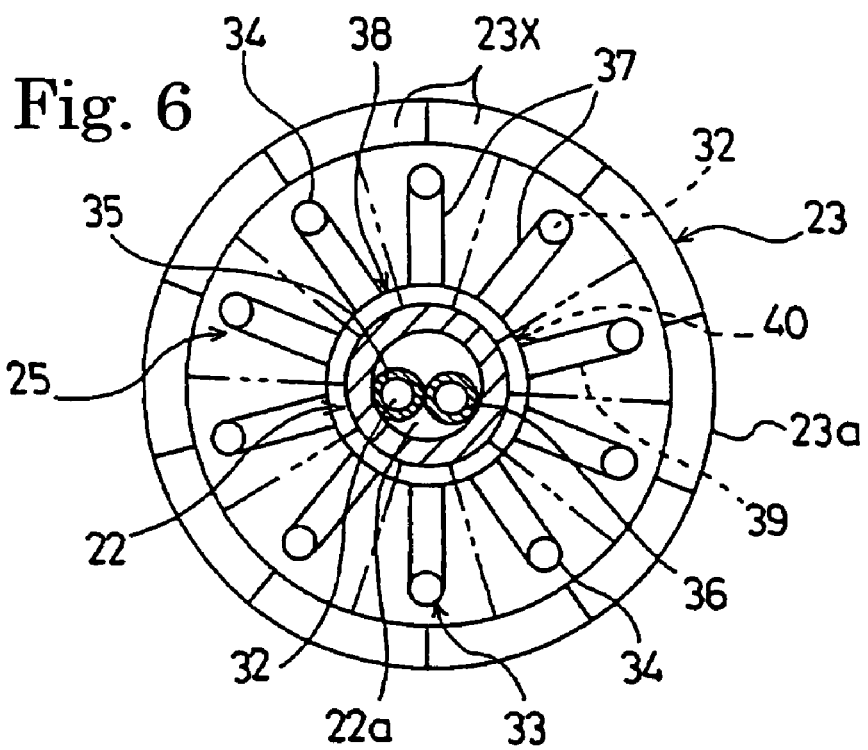

METHOD OF MANUFACTURING PNEUMATIC TIRE AND TIRE BUILDING MACHINE USED THEREFOR

TECHNICAL FIELD

The present invention relates to a method of manufacturing pneumatic tires and a tire building machine used therefore, and more particularly, to a method of manufacturing a pneumatic tire and a tire building machine used therefore, in which separation of an innerliner formed of thermoplastic elastomer can be suppressed and handling ability of the innerliner can be improved when a green tire is built.

TECHNICAL BACKGROUND

In general, a pneumatic tire has an innerliner formed of rubber such as butyl rubber inside the tire to prevent permeation of air with which the inner cavity is filled. Recently, it has been proposed to use thermoplastic elastomer for the innerliner instead of rubber to lighten a tire (see Unexamined Japanese Patent Application Publication Nos. 10-25375 and 11-199713, for example). The innerliner of thermoplastic elastomer can be formed into a film thinner than that of rubber, which makes a contribution to weight lightening of a tire.

An adhesive is applied to the radially outer surface of the innerliner film of thermoplastic elastomer to secure adhesion to a tire component such as a carcass ply disposed outwardly of the innerliner. Therefore, when the innerliner with the adhesive is applied to a tire building drum during building of a green tire, there is a handling problem such that parts of the radially outer surface of the innerliner adhere to one another, for example. If the tackiness of the adhesive is reduced to facilitate handling, a problem arises such as separation of the innerliner after building of a green tire.

DISCLOSURE OF THE INVENTION

An object of the present invention is to provide a method of manufacturing a pneumatic tire and a tire building machine used therefore, in which separation of an innerliner formed of thermoplastic elastomer can be suppressed and handling ability of the innerliner can be improved when a green tire is built.

In order to achieve the above object, the present invention provides a method of manufacturing a pneumatic tire having an innerliner formed of thermoplastic elastomer, comprising the steps of: heating a surface of a tire building drum in advance; placing the innerliner on the heated surface of the tire building drum, the innerliner being cylindrically shaped and having a radially outer surface to which an adhesive has been applied; disposing uncured tire components radially outwardly of the innerliner to form a green tire; and curing the green tire.

A tire building machine according to the present invention comprises a tire building drum that is expandable and contractible, and heating means that can heat a surface of the tire building drum.

According to the present invention, since the surface of the tire building drum is heated in advance, an adhesive that is high in cohesion and low in tackiness at a room temperature, and is high in tackiness when heated, can be used for the adhesive that is applied to the radially outer surface of the innerliner.

Therefore, when the innerliner of thermoplastic elastomer is applied to the tire building drum, even though parts of the radially outer surface of the innerliner to which the adhesive has been applied are stuck to each other, the parts can be easily separated from each other, allowing for easy handling of the innerliner. The innerliner and tire component can be adhered to each other with the adhesive being high in tackiness, and the heated adhesive is naturally cooled during assembling of the green tire, becoming high in cohesion again. Accordingly, the innerliner of the assembled green tire can be suppressed from separating from the tire component.

BRIEF DESCRIPTION OF THE DRAWINGS

FIG. 5 is an enlarged cross-sectional view showing a third embodiment of a tire building machine used for the method of manufacturing a pneumatic tire according to the present invention.

FIG. 6 is an enlarged cross-sectional view showing a fourth embodiment of a tire building machine used for the method of manufacturing a pneumatic tire according to the present invention.

BEST MODES FOR CARRYING OUT THE INVENTION

Figure 1:
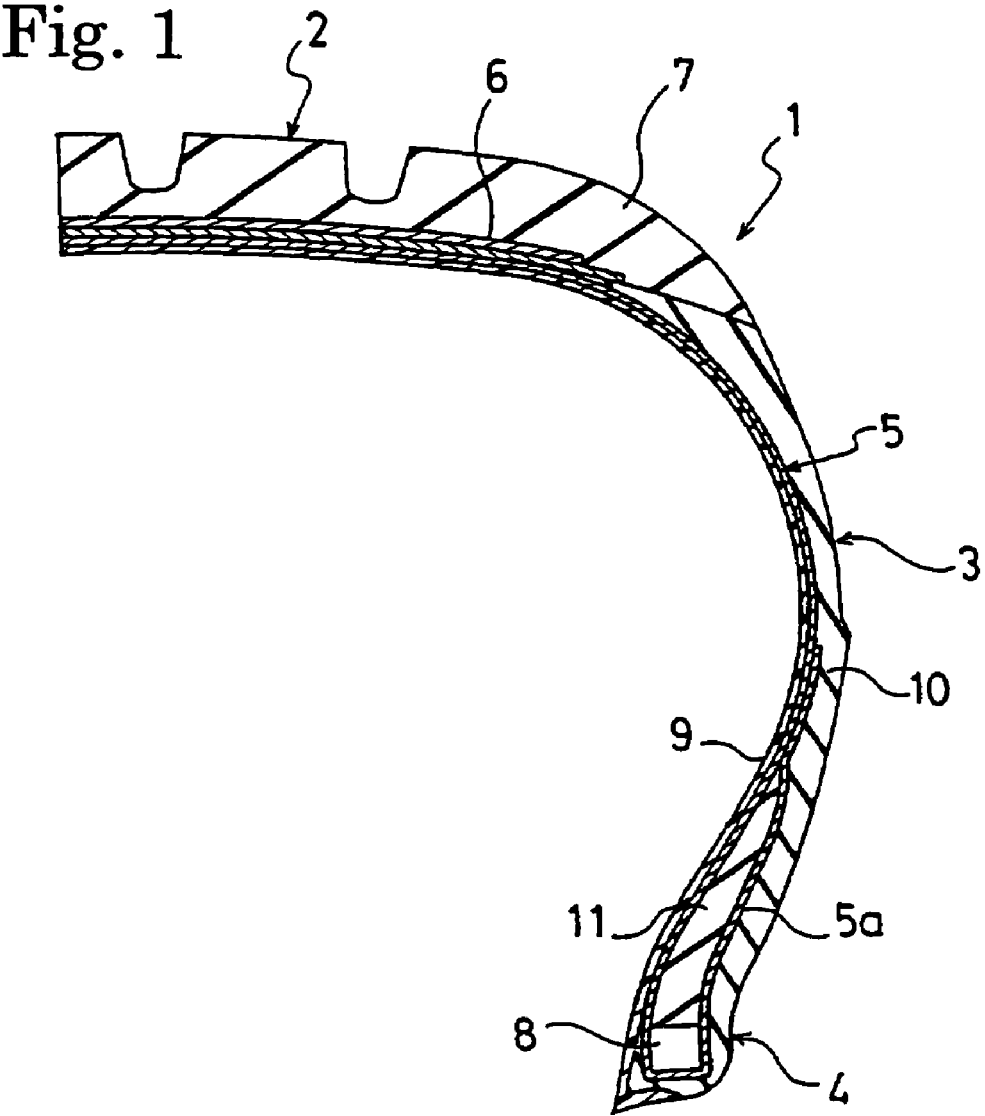
FIG. 1 is a partial cross-sectional view showing one example of a pneumatic tire manufactured by use of a method of manufacturing a pneumatic tire according to the present invention.

Embodiments of the present invention will be described in detail below with reference to the attached drawings. Like elements in the drawings are referred by the like reference characters and duplicate descriptions will be omitted.

Referring to FIG. 1, there is shown one example of a pneumatic tire manufactured by use of a method of manufacturing a pneumatic tire according to the present invention, and reference numeral 1 denotes a pneumatic tire, reference numeral 2 denotes a tread, reference numeral 3 denotes a sidewall, and reference numeral 4 denotes a bead.

A carcass ply 5 extends between the right and left beads 4 in the tire; the carcass ply comprises a rubber layer and reinforcing cords disposed in the rubber layer; the reinforcing cords, which extend in the radial direction of the tire, are placed at prescribed intervals in the circumferential direction of the tire. A plurality of belt plies 6 are provided radially outwardly of the carcass play 5 in the tread 2; each belt ply comprises a rubber layer and reinforcing cords disposed in the rubber layer; the reinforcing cords, which obliquely extend in the circumferential direction of the tire, are placed at prescribed intervals in the circumferential direction of the tire. A tread rubber layer 7 are disposed radially outwardly of the belt plies 6.

A bead core 8 are embedded in each of the right and left beads 4, and the opposing ends 5a of the carcass ply 5 are turned up around the bead cores 8 from the inner side of the tire toward the outer side thereof. An innerliner 9 of thermoplastic elastomer formed into a film is provided inwardly of the carcass ply 5. A side rubber layer 10 is disposed outwardly of the carcass play 5 in each sidewall 3. Reference numeral 11 denotes a bead filler placed radially outwardly of each bead core 6.

Figure 2:
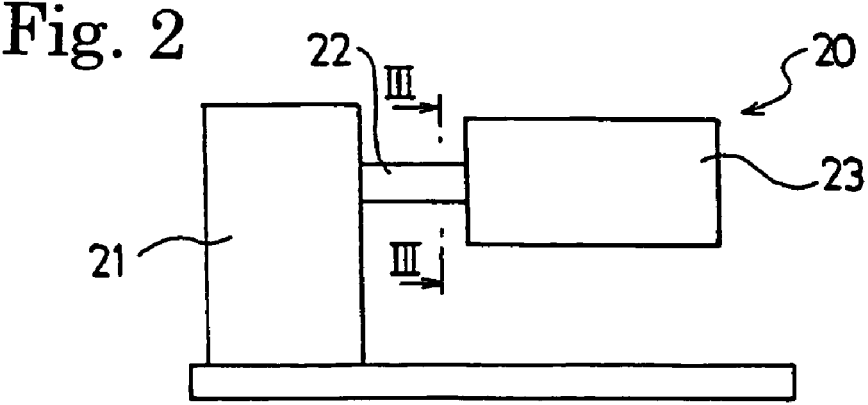
FIG. 2 is a front view showing a first embodiment of a tire building machine used for the method of manufacturing a pneumatic tire according to the present invention.
Figure 3:
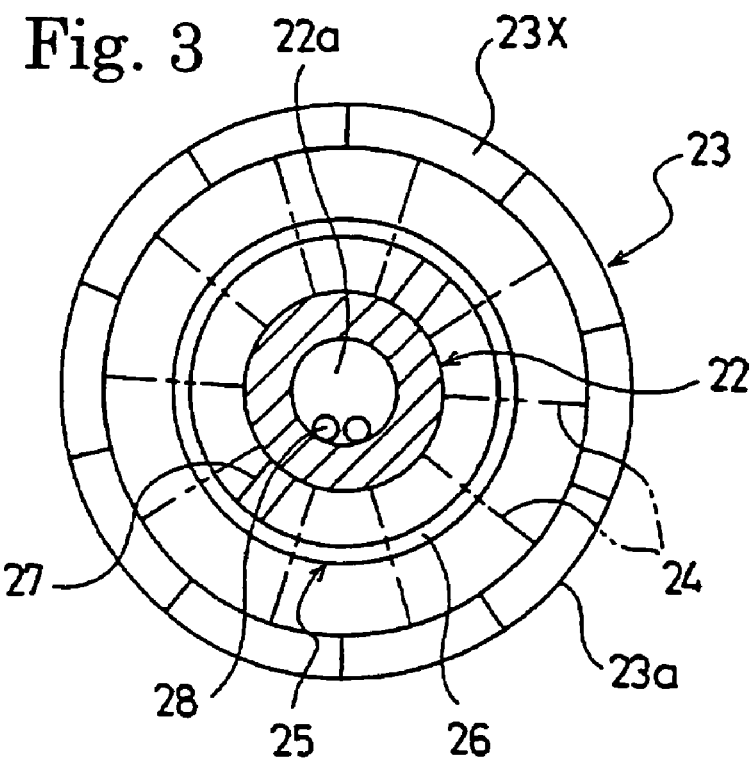
FIG. 3 is an enlarged cross-sectional view taken along line III-III of FIG. 2.

Referring to FIGS. 2 and 3, there is shown a first embodiment of a tire building machine used for the method of manufacturing a pneumatic tire according to the present invention, and reference numeral 20 denotes a tire building machine.

This tire building machine 20 includes a support part 21, a horizontally extending rotary shaft 22 supported by the support part 21, and a tire building drum 23 fixed to the rotary shaft 22. The rotary shaft 22 is coupled to a driving means (not shown) installed in the support part 21. The tire building drum 23 rotatably supported by the support part 21 through the rotary shaft 22 is rotated by operation of the driving means.

The tire building drum 23, which comprises a plurality of metal drum segments 23X, is cylindrically formed, as shown in FIG. 3. The drum segments 23X are attached expandably and contractibly in the radial direction of the drum to the rotary shaft 22 via a conventionally well-known expanding and contracting mechanism schematically shown with chain double-dashed lines 24.

The tire building drum 23, which comprises a plurality of metal drum segments 23X, is cylindrically formed, as shown in FIG. 3. The drum segments 23X are attached expandably and contractibly in the radial direction of the drum to the rotary shaft 22 via a conventionally well-known expanding and contracting mechanism schematically shown with chain double-dashed lines.

A heating means 25 that can heat the surface (radially outer surface) 23a of the tire building drum 23 is provided inside the tire building drum 23. The heating means 25 includes a plurality of ring-shaped electric heating elements 26. The plurality of electric heating elements 26, which are disposed at prescribed intervals in the widthwise direction of the drum and supported by support members 27 that protrude on the rotary shaft 22, are rotatable with the rotary shaft 22.

The rotary shaft 22 has a hollow interior 22a, in which are placed two wires 28 connected to the electric heating elements 26. A temperature sensor (not shown) comprising, for example, a thermocouple is attached to each drum segment 23X, and the strength of current that flows in each electric heating element 26 is adjusted according to the temperature detected by the temperature sensor, whereby the temperature of the surface 23a of the tire building drum 23 heated can be adjusted.

Figure 4:
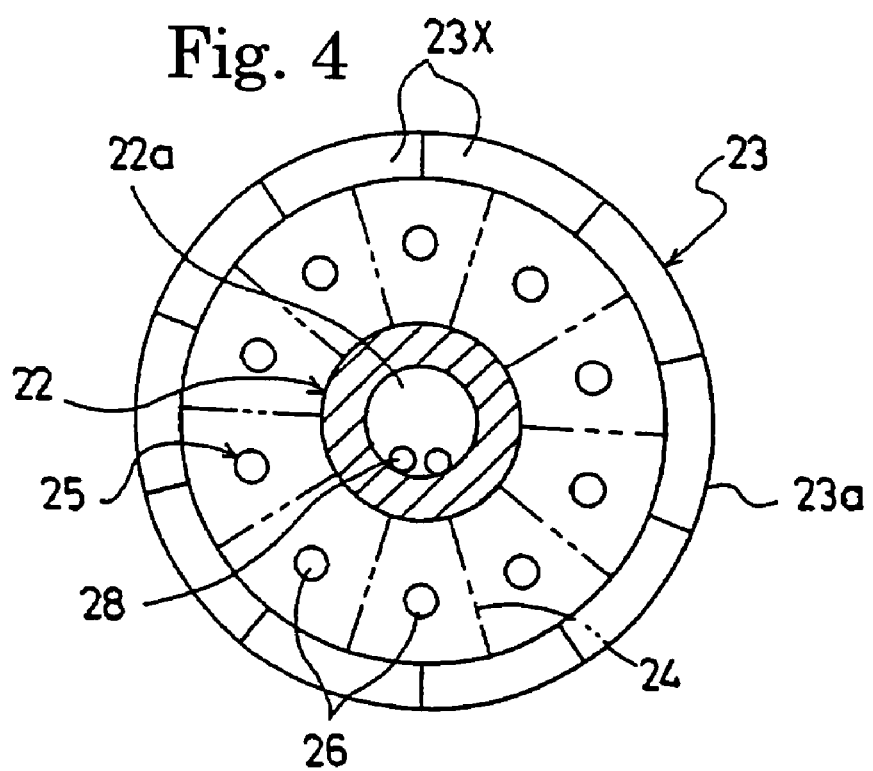
FIG. 4 is an enlarged cross-sectional view showing a second embodiment of a tire building machine used for the method of manufacturing a pneumatic tire according to the present invention.

Referring to FIG. 4, there is shown a second embodiment of a tire building machine used for the method of manufacturing a pneumatic tire according to the present invention. In this second embodiment, the heating means 25 has bar-shaped electric heating elements 26 instead of the ring-shaped ones described above. The bar-shaped electric heating elements 26, which extend in the widthwise direction of the drum, are disposed at prescribed intervals in the circumferential direction of the drum.

Referring to FIG. 5, there is shown a third embodiment of a tire building machine used for the method of manufacturing a pneumatic tire according to the present invention. In this third embodiment, the heating means 25 described above comprises an infrared emitter having light sources 29 such as infrared lamps that emit infrared radiation to the surface 23a of the tire building drum 23.

The light sources 29 are attached to a pair of circularly curved support members 31 at prescribed intervals. The pair of circularly curved support members 31 are arrange such that they can be moved between an emitting position that are near the surface 23a shown in the drawing and a waiting position spaced apart from the surface 23a. The light sources 29 are electrically connected to a power supply (not shown), and can be turned on at the emitting position to emit infrared radiation to the surface 23a of the tire building drum 23, thereby heating the surface 23a.

When the infrared emitter 30 is used for the heating means 29 as described above, the surface 23a of the tire building drum 23 is preferably colored black to effectively heat the surface 23a of the tire building drum 23 by infrared radiation. All the surface 23a may be colored black, or only the region of the surface 23a to which the innerliner 9 is attached may be colored black. The surface 23a of the tire building drum 23 is colored black by, for example, applying a black paint to the surface 23a.

Referring to FIG. 6, there is shown a fourth embodiment of a tire building machine used for the method of manufacturing a pneumatic tire according to the present invention. In this fourth embodiment, the heating means 25 comprises a medium heating device 33 having a circulating passage 32, disposed inside the tire building drum 23, for circulating a heating medium that heats the surface 23a of the tire building drum 23.

A plurality of first pipes 34 that extend in the width wise direction of the drum are placed inside the tire building drum 23 at prescribed intervals in the circumferential direction of the drum. There are disposed in the hollow interior 22a of the rotary shaft 22a second pipe 35 for supply the heating medium to the first pipes 34 from a heating medium supply source (not shown), and a third pipe 36 for returning the heating medium from the first pipes 34 to the heating medium supply source. The second pipe 35 is coupled to a connection pipe assembly 38 having a plurality of branch pipes 37, which are coupled to the one ends of the first pipes 34.

The third pipe 35 is also coupled to a connection pipe assembly 40 having a plurality of branch pipes 39, which are coupled to the other ends of the first pipes 34. The heating medium supplied from the heating medium supply source returns through the second pipe 35, connection pipe assembly 38, first pipes 34, connection pipe assembly 40 and third pipe 36 to the heating medium supply source. The circulating passage 32 for circulating the heating medium that heats the surface 23a of the tire building drum 23 is formed inside the second pipe 35, connection pipe assembly 38, first pipes 34, connection pipe assembly 40 and third pipe 36.

The circulating passage 32 is preferably arranged so as to pass near the surface 23a of the tire building drum 23 to heat the surface 23a quickly, but may be arranged only in the hollow interior 22a of the rotary shaft 22.

The heating medium may be any heating medium that can heat the surface 23a of the tire building drum 23, and examples of the heating medium preferably includes hot water, heated oil and the like.

The method of manufacturing a pneumatic tire of the present invention will be described below with reference to FIGS. 7a to 7d.

First, the heating means 25 is turned on to heat the surface 23a of the tire building drum 23 in advance. The heat-up temperature of the surface 23a is ranged from 40 to 60 .degree. C. when an adhesive having a low tackiness at a room temperature, described later, is used. The heating means 25 heats the surface at least until an uncured carcass ply 5', described later, is applied.

Figure 7A:
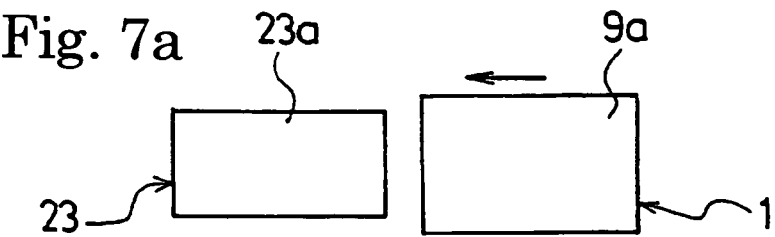
FIG. 7a is a front view illustrating a step of applying an innerliner having an adhesive on its radially outer surface to a tire building drum that has been heated.

Next, as shown in FIG. 7a, a cylindrical innerliner film 9 of thermoplastic elastomer having an adhesive on its radially outer surface 9a is placed radially outwardly of the tire building drum 23. The adhesive used here is one having a glass transition temperature in the range of −20 to 30 .degree. C.

The glass transition temperature ranged from −20 to 30 .degree. C. is high in cohesion and is low in tackiness at a room temperature, so handling of the innerliner with the adhesive is facilitated. When the surface is heated at a temperature of 40 to 60 .degree. C., the adhesive exhibits a sufficient tackiness, facilitating adhering of an uncured carcass ply 5'.

If the glass transition temperature is lower than −20 .degree. C., handling is deteriorated because the tackiness of the adhesive is too high at a room temperature. If the glass transition temperature is higher than 30 .degree. C., the surface needs to be heated up to temperatures above 60 .degree. C. to obtain a sufficient tackiness; therefore, it is not preferable in productivity because of an increase in heating time.

Figure 7B:
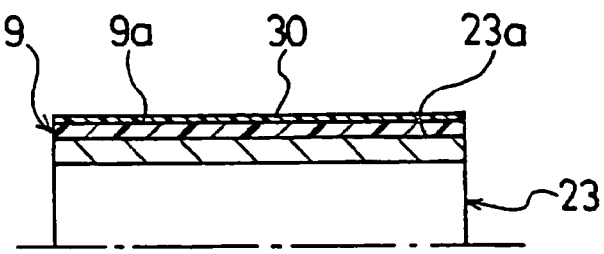
FIG. 7b is a half cross-sectional view showing a state in which the innerliner is attached to the tire building drum that has been radially expanded.
Figure 7C:
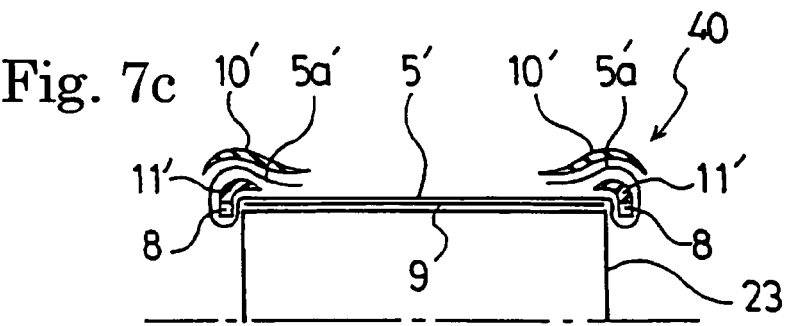
FIG. 7c is a schematic view illustrating a step of assembling a carcass assembly.

After placing of the innerliner 9, the tire building drum 23 is radially expanded to attach the cylindrical innerliner 9 to the surface 23a of the tire building drum 23, as shown in FIG. 7b. In FIG. 7b, reference numeral 30 denotes a layer of the adhesive that has been applied to the radially outer surface 9a of the innerliner 9.

By attaching the innerliner 9, the adhesive layer 30 is heated to thereby exhibit a sufficient tackiness. After the adhesive layer exhibits a sufficient tackiness, uncured tire components are attached to assemble a green tire as in the prior art. That is, an uncured sheet-shaped carcass ply 5' is bonded onto the radially outer side of the innerliner 9 with the adhesive layer 30, and the circumferential opposing ends of the uncured carcass ply 5' are spliced together. Bead cores 8 to which uncured bead fillers 11' are attached in advance are then placed on the radially outer side of the uncured carcass ply 5'. The opposing ends 5a' of the uncured carcass ply 5' are turned up so as to wrap the bead cores 8 and the uncured bead fillers 11', and uncured side rubber layers 10' are applied radially outwardly thereof to form a carcass assembly 40 (see FIG. 7c).

The tire building drum 23 is radially contracted, and the carcass assembly 40 that has been cylindrically formed is removed from the tire building drum 23. After the carcass assembly 40 has been removed from the tire building drum 23, the heated adhesive layer 30 is naturally cooled, whereby the temperature thereof is lowered, which makes the cohesion of the adhesive layer 30 high again. Therefore, the innerliner 9 does not easily separate from the uncured carcass ply 5'. The heated adhesive layer 30 is naturally cooled down to a room temperature during assembling of the green tire, so it is not necessary to provide a cooling step in particular. However, a forcibly cooling step may be provided to shorten the assembling time.

Figure 7D:
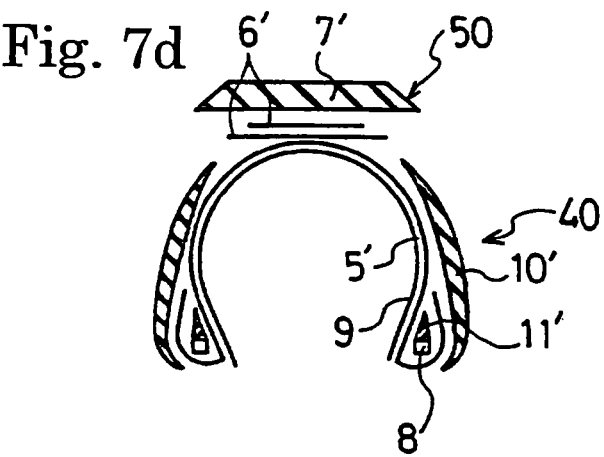
FIG. 7d is a schematic view illustrating a step of inflating the carcass assembly to press it against a belt and tread package.

Next, the carcass assembly 40 that has been removed from the tire building drum 23 is inflated into a toroidal shape, as shown in FIG. 7d, and pressed against the radially inner side of a cylindrical belt and tread package 50, comprising uncured belt plies 6' and an uncured tread rubber layer 7', that has been formed in advance. The belt and tread package 50 is adhered to the carcass assembly 40 by pressing with press rollers (not shown) to form the green tire. The green tire is cured by heating, obtaining the pneumatic tire 1 shown in FIG. 1.

According to the present invention, since the surface 23a of the tire building drum 23 is preheated, an adhesive that is high in cohesion and low in tackiness at a room temperature, and is high in tackiness when heated, can be used for the adhesive that is applied to the radially outer surface 9a of the innerliner 9.

Therefore, when the innerliner 9 of thermoplastic elastomer formed into a film is applied to the tire building drum 23, even though parts of the radially outer surface 9a of the innerliner 9 to which the adhesive has been applied are stuck to each other, the parts can be easily separated from each other, allowing for easy handling of the innerliner 9. The innerliner 9 and uncured carcass ply 5' can be adhered to each other with the adhesive layer 30 being high in tackiness, and the heated adhesive layer 30 is naturally cooled during assembling of the green tire, becoming high in cohesion again. Accordingly, the innerliner 9 of the assembled green tire can be suppressed from separating from the uncured carcass ply 5'.

In the present invention, the thickness of the innerliner 9 is preferably in the range from 80 μm to 300 μm. The thickness is less than 80 μm, the innerliner can not provide a sufficient function as a layer that prevents air permeation. If the thickness is greater than 300 μm, it takes time to heat the adhesive, deteriorating productivity.

The thermoplastic elastomer of which the innerliner 9 is formed may be a well-known one conventionally used for the innerliner 9, and preferably include a thermoplastic elastomer having a thermoplastic resin component and rubber component parts dispersed therein, such as thermoplastic elastomer composition disclosed in unexamined Japanese Patent Application Publication No. 11-199713, for example.

The adhesive that is applied to the radially outer surface of the innerliner 9 may be a conventionally well-known one, and preferred examples of the adhesive may include an adhesive of styrene block copolymer, and the like.

In the method of manufacturing a pneumatic tire of the present invention, it is preferable in terms of productivity that the surface 23a of the tire building drum 23 is preheated before the cylindrical innerliner 9 having the adhesive on its radially outer surface is placed, as described above. However, after the innerliner 9 having the adhesive on its radially outer surface is attached to the tire building drum 23, the surface 23a of the tire building drum 23 may be heated by the heating means 25 to heat the adhesive.

EXAMPLE

Prepared were test films 1 to 5 including innerliner films of thermoplastic elastomer and adhesives A to E applied to the respective outer surfaces thereof, the adhesives A to E having blending ratios and glass transition temperatures shown in Table 1. Handling ability of the test films were evaluated on the grade of four scales that are ⊚, ○, Δ, and X.

⊚ means that parts of the outer surface of the test film to which the adhesive had been applied were hardly stuck to each other even though the parts were forced to contact to each other. ○ means that, when parts of the outer surface of the test film to which the adhesive had been applied were forced to contact to each other, the parts were stuck to each other, but they could be easily separated from each other. Δ means that, when parts of the outer surface of the test film to which the adhesive had been applied were forced to contact to each other, the parts were stuck to each other, but they could be separated from each other when they were separated soon after sticking. X means that, when parts of the outer surface of the test film to which the adhesive had been applied were forced to contact to each other, the parts were stuck to each other, and when an attempt was made to separate the parts, the test film was elongated with the parts not separated. ⊚, ○ and Δ belong to allowable levels. The results were shown in Table 2.

Test green tires 1 to 5 each having a construction shown in FIG. 1 were prepared according to the method of the present invention described above, using the adhesives A to E. The temperature of the surface of the tire building drum was about 50 .degree. C. Each test green tire was checked for separation resistance of the innerliner according to the following method, obtaining the results shown in Table 3.

Separation Resistance

The test green tire is cut to visually observe the state of separation between the innerliner and uncured carcass ply, evaluating the result on the grade of four scales that are ⊚, ○, Δ, and X.

⊚ means that there was no separation. ○ means that there was very little separation that was not problematic occurred in the connection part of the uncured carcass ply. Δ means that there was separation occurred in the connection part of the uncured carcass ply and another part other than the connection part, but the separation parts could be repaired by press operation. X means that there was separation occurred around the entire circumference of the tire, and repair of the separation was impossible. ⊚ and ○ belong to allowable levels.

TABLE 1

| Compounding Ingredients | Name of Articles | Company Name | A | B | C | D | E |
|---|---|---|---|---|---|---|---|
| SBS | Tufprene A | Asahikasei Co., Ltd. | 40 | 40 | 40 | 40 | 40 |
| ESBS | Epofriend A1020 | Daicel Chemical Industries, Ltd. | 60 | 60 | 60 | 60 | 60 |
| Stearic Acid | Granular Stearic Acid | Nihonyushi Co., Ltd. | 1 | 1 | 1 | 1 | 1 |
| Dicumyl Peroxide | Percumyl D-40 | Kayaku Akuzo Co., Ltd. | 1 | 1 | 1 | 1 | 1 |
| Terpene Resin | YS Resin D105 | Yasuhara Chemical Co., Ltd. | 30 | 50 | 70 | | |
| Modified Terpene Resin | YS Resin TR105 | Yasuhara Chemical Co., Ltd. | | | | 100 | 130 |
| Glass Transition Temperature (° C.) | | | −30 | −20 | 10 | 30 | 40 |

Note:
(1) SBS is short for styrene-butadiene block copolymer.
(2) ESBS is short for epoxidized styrene-butadiene block copolymer.
(3) The values of the compounding ingredients are shown in parts by weight.

TABLE 2

| | Test Film 1 | Test Film 2 | Test Film 3 | Test Film 4 | Test Film 5 |
|---|---|---|---|---|---|
| Adhesive | A | B | C | D | E |
| Handling Ability | X | Δ | ○ | ⊚ | ⊚ |

TABLE 3

| | Test Green Tire 1 | Test Green Tire 2 | Test Green Tire 3 | Test Green Tire 4 | Test Green Tire 5 |
|---|---|---|---|---|---|
| Adhesive | A | B | C | D | E |
| Separation Resistance | Δ | ⊚ | ⊚ | ○ | Δ |

From Tables 1 to 3, it is understood that the glass transition temperature of the adhesive is preferably ranged from −20 to 30 .degree. C.

INDUSTRIAL APPLICABILITY

The present invention having the aforementioned excellent effects can be very effectively used for manufacturing pneumatic tires to be mounted on vehicles.

What is claimed is:

1. A method of manufacturing a pneumatic tire having an innerliner formed of thermoplastic elastomer, comprising the steps of:
heating a surface of a tire building drum in advance;
placing the innerliner on the heated surface of the tire building drum, the innerliner having a thickness of 80 μm to 300 μm and being cylindrically shaped and having a radially outer surface to which an adhesive has been applied;
disposing uncured tire components radially outwardly of the innerliner to form a green tire; and
curing the green tire,
wherein the adhesive has a glass transition temperature ranged from −20° C. to 30° C.,
wherein the surface of the tire building drum is heated at a temperature of 40° C. to 60° C. in the step of heating the tire building drum,
wherein the heating is carried out at least until the uncured tire components are applied to and radially outward of the innerliner, and
wherein by placing the adhesive in a higher tackiness condition through the heating, than the tackiness condition prior to heating, the uncured tire components are attached to the innerliner.

2. A method of manufacturing a pneumatic tire according to claim 1, wherein the step of disposing uncured tire components includes disposing an uncured carcass ply, bead cores and uncured side rubber layers radially outwardly of the innerliner to form a carcass assembly and inflating the carcass assembly in a toroidal shape to press against a radially inner side of a cylindrical belt and tread package having an uncured belt ply and an uncured tread rubber layer.

3. A method of manufacturing a pneumatic tire according to claim 2, wherein, after the carcass assembly is formed, the tire building drum is contracted to remove the carcass assembly from the tire building drum and, after the heated adhesive layer is naturally cooled, the carcass assembly is inflated into a toroidal shape and pressed against the radially inner side of a cylindrical belt and tread package, comprising uncured belt plies and an uncured tread rubber layer.

4. A method of manufacturing a pneumatic tire according to claim 2, wherein, after the carcass assembly is formed, the tire building drum is contracted to remove the carcass assembly from the tire building drum and, after the heated adhesive layer is forcibly cooled, the carcass assembly is inflated into a toroidal shape and pressed against the radially inner side of a cylindrical belt and tread package, comprising uncured belt plies and an uncured tread rubber layer.

5. A method of manufacturing a pneumatic tire according to claim 1, wherein the adhesive is high in cohesion and is low in tackiness at a room temperature, and when the surface of the tire building drum is heated at a temperature of 40° C. to 60° C. the adhesive exhibits a sufficient tackiness.

* * * * *